US012776275B2

(12) United States Patent
Im et al.

(10) Patent No.: US 12,776,275 B2
(45) Date of Patent: Oct. 27, 2026

(54) DISPLAY DEVICE AND ELECTRONIC DEVICE INCLUDING THE SAME WITH FIRST AND SECOND LIGHT-EMITTING ELEMENTS HAVE DIFFERENT VIEWING ANGLES

(71) Applicant: Samsung Display Co., Ltd., Yongin-si (KR)

(72) Inventors: Changbin Im, Yongin-si (KR); Byoung-Haw Park, Yongin-si (KR); Jong Jae Lee, Yongin-si (KR); Yong-Sik Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/329,143

(22) Filed: Sep. 15, 2025

(65) Prior Publication Data

US 2026/0212814 A1 Jul. 23, 2026

(30) Foreign Application Priority Data

Jan. 23, 2025 (KR) ........................ 10-2025-0010241

(51) Int. Cl.
*G09G 3/3233* (2016.01)

(52) U.S. Cl.
CPC ..................... *G09G 3/3233* (2013.01); *G09G 2300/0819* (2013.01); *G09G 2300/0852* (2013.01);
(Continued)

(58) Field of Classification Search
CPC ............ G09G 3/2007–204; G09G 3/30–3291; G09G 2300/0443–0447; G09G 2300/0804–0819; G09G 2300/0852; G09G 2300/0861; G09G 2310/0262; G09G 2310/08; G09G 2320/02; G09G 2320/0233; G09G 2320/028; G09G 2320/0653; G09G 2320/068; G09G 2358/00; G09G 2380/10;
(Continued)

(56) References Cited

U.S. PATENT DOCUMENTS 12,518,702 B2 * 1/2026 Kim ..................... G09G 3/3233
2012/0127064 A1 * 5/2012 Kawano ............... G09G 3/3225
345/76
(Continued)

*Primary Examiner* — Keith L Crawley
(74) *Attorney, Agent, or Firm* — Womble Bond Dickinson (US) LLP

(57) ABSTRACT

A display device includes a display panel including pixels and a panel driver driving the display panel. Each pixel includes a first light-emitting element, a second light-emitting element, a first transistor generating a driving current, a first mode transistor providing the driving current to the first light-emitting element in response to a first signal, a second mode transistor providing the driving current to the second light-emitting element in response to a second signal, and an emission transistor connecting the first transistor to the first and second mode transistors in response to an emission signal having a plurality of emission cycles. The panel driver stepwise changes an on-duty of each of the first signal and the second signal over a plurality of frame periods. The number of steps in which the on-duty changes is determined based on the number of the emission cycles of the emission signal in one frame period.

20 Claims, 12 Drawing Sheets

(52) U.S. Cl.
CPC ............... *G09G 2300/0861* (2013.01); *G09G 2310/08* (2013.01); *G09G 2320/0233* (2013.01); *G09G 2320/068* (2013.01); *G09G 2358/00* (2013.01)

(58) Field of Classification Search
CPC .................... B60K 35/22; B60K 35/29; B60K 35/65–658; B60K 2360/151; B60K 2360/1526; B60K 2360/186–1876; B60K 2360/195; B60K 2360/349
See application file for complete search history.

(56) References Cited

U.S. PATENT DOCUMENTS

| | | | | |
|---|---|---|---|---|
| 2022/0236595 | A1* | 7/2022 | Dong | G02F 1/134309 |
| 2023/0100284 | A1* | 3/2023 | Yao | G09G 3/20<br>345/55 |
| 2023/0217690 | A1* | 7/2023 | Hong | H10K 59/8723<br>345/173 |
| 2024/0127760 | A1* | 4/2024 | Cho | G09G 3/3233 |
| 2024/0221670 | A1* | 7/2024 | Lee | G09G 3/3241 |
| 2024/0257769 | A1* | 8/2024 | Kim | G09G 3/3233 |
| 2024/0420640 | A1* | 12/2024 | Hwang | G09G 3/32 |
| 2025/0174180 | A1* | 5/2025 | Choi | G09G 3/3233 |
| 2025/0218365 | A1* | 7/2025 | Yun | G09G 3/3233 |
| 2025/0218383 | A1* | 7/2025 | Yun | G09G 3/3258 |
| 2025/0316230 | A1* | 10/2025 | Kwon | G09G 3/3233 |
| 2025/0393428 | A1* | 12/2025 | Hsieh | H10K 59/122 |
| 2026/0045218 | A1* | 2/2026 | Hyun | G09G 3/3233 |

* cited by examiner

DISPLAY DEVICE AND ELECTRONIC DEVICE INCLUDING THE SAME WITH FIRST AND SECOND LIGHT-EMITTING ELEMENTS HAVE DIFFERENT VIEWING ANGLES

CROSS-REFERENCE TO RELATED APPLICATION

The present application claims priority to and the benefit of Korean Patent Application No. 10-2025-0010241, filed on Jan. 23, 2025, in the Korean Intellectual Property Office, the entire disclosure of which is incorporated herein by reference.

BACKGROUND

1. Field

Aspects of some embodiments of the present disclosure relate to a display device and an electronic device including the same.

2. Description of the Related Art

Generally, a display device may display images with a wide viewing angle so that the images may be recognized not only by a user positioned on a front of the display device but also by a user positioned on a side of the display device. Recently, for the purpose of protecting personal information or for safety in an automotive display device mounted in an automobile, a display device, which operates in a private mode (or privacy mode) that displays images only to a user positioned in a front of the display device, has been developed. For example, an automotive display device positioned to correspond to a passenger seat of an automobile may operate in a public mode that displays images with a wide viewing angle so as to display images to both a driver and a passenger, or may operate in a private mode that displays images with a narrow viewing angle so as to display images only to the passenger.

The above information disclosed in this Background section is only for enhancement of understanding of the background and therefore the information discussed in this Background section does not necessarily constitute prior art.

SUMMARY

Aspects of some embodiments of the present disclosure relate to a display device and an electronic device including the same. For example, aspects of some embodiments of the present disclosure relate to a display device that may be capable of supporting a public mode and a private mode and an electronic device including the display device.

Aspects of some embodiments include a display device with relatively improved image quality when switching between a public mode and a private mode and an electronic device including the display device.

A display device according to some embodiments includes a display panel including a plurality of pixels, and a panel driver configured to drive the display panel. According to some embodiments, at least one pixel among the pixels includes a first light-emitting element having a first viewing angle, a second light-emitting element having a second viewing angle different from the first viewing angle, a first transistor configured to generate a driving current, a first mode transistor configured to provide the driving current to the first light-emitting element in response to a first signal, a second mode transistor configured to provide the driving current to the second light-emitting element in response to a second signal, and an emission transistor configured to connect the first transistor to the first and second mode transistors in response to an emission signal having a plurality of emission cycles each including an emission-off period and an emission-on period in one frame period. According to some embodiments, the panel driver stepwise changes an on-duty of each of the first signal and the second signal over a plurality of frame periods in response to a mode switching signal which indicates a switching from a first mode to a second mode. According to some embodiments, the number of steps in which the on-duty changes is determined based on the number of the emission cycles of the emission signal in one frame period.

According to some embodiments, the on-duty may change on one frame period basis, and the number of the steps in which the on-duty changes may be equal to the number of the emission cycles of the emission signal in one frame period.

According to some embodiments, the on-duty may change on N frame periods basis, where N is a natural number greater than or equal to 2, and the number of the steps in which the on-duty changes may be equal to a value obtained by multiplying N by the number of the emission cycles of the emission signal in one frame period.

According to some embodiments, the on-duty uniformly may change in the steps in which the on-duty changes.

According to some embodiments, the first viewing angle may be a wide viewing angle, and the second viewing angle may be a narrow viewing angle narrower than the first viewing angle.

According to some embodiments, the first light-emitting element may be a public light-emitting element in which light emitted from the first light-emitting element is provided to both a first user which is positioned on a front of the display device and a second user which is positioned on a side of the display device, and the second light-emitting element may be a private light-emitting element in which light emitted from the second light-emitting element is provided to the first user and not provided to the second user.

According to some embodiments, when the mode switching signal indicates a switching from a public mode to a private mode, the panel driver may stepwise decrease an on-duty of the first signal and may stepwise increase an on-duty of the second signal over a plurality of first frame periods, and when the mode switching signal indicates a switching from the private mode to the public mode, the panel driver may stepwise increase the on-duty of the first signal and may stepwise decrease the on-duty of the second signal over a plurality of second frame periods.

According to some embodiments, each of the first signal and the second signal may be a global signal simultaneously (or concurrently) provided to the pixels.

According to some embodiments, the first transistor may include a gate, a first terminal connected to a power line configured to transmit a first power voltage, and a second terminal, and the at least one pixel may further include a second transistor configured to transmit a data signal to a first node in response to a first gate signal, a third transistor configured to connect the gate and the second terminal of the first transistor in response to a second gate signal, a fourth transistor configured to transmit a first initialization voltage to the gate of the first transistor in response to a third gate signal, a fifth transistor configured to transmit a reference voltage to the first node in response to the second gate signal, a sixth transistor configured to transmit a second initialization voltage to a first terminal of the first light-emitting element in response to a fourth gate signal, a seventh transistor configured to transmit the second initialization voltage to a first terminal of the second light-emitting element in response to the fourth gate signal, a first capacitor connected between the power line and the first node, and a second capacitor connected between the first node and the gate of the first transistor.

According to some embodiments, the first transistor may include a gate, a first terminal, and a second terminal, and the at least one pixel may further include a second transistor configured to transmit a data signal to the first terminal of the first transistor in response to a first gate signal, a third transistor configured to connect the gate and the second terminal of the first transistor in response to a second gate signal, a fourth transistor configured to transmit a first initialization voltage to the gate of the first transistor in response to a third gate signal, a fifth transistor configured to transmit a first power voltage to the first terminal of the first transistor in response to the emission signal, a sixth transistor configured to transmit a second initialization voltage to a first terminal of the first light-emitting element in response to a fourth gate signal, a seventh transistor configured to transmit the second initialization voltage to a first terminal of the second light-emitting element in response to the fourth gate signal, and a first capacitor connected between a power line configured to transmit the first power voltage and the gate of the first transistor.

An electronic device according to some embodiments includes a processor, and a display device configured to receive input image data and a mode switching signal which indicates a switching from a first mode to a second mode, and to display an image corresponding to the input image data. According to some embodiments, the display device includes a display panel including a plurality of pixels, and a panel driver configured to drive the display panel. According to some embodiments, at least one pixel among the pixels includes a first light-emitting element having a first viewing angle, a second light-emitting element having a second viewing angle different from the first viewing angle, a first transistor configured to generate a driving current, a first mode transistor configured to provide the driving current to the first light-emitting element in response to a first signal, a second mode transistor configured to provide the driving current to the second light-emitting element in response to a second signal, and an emission transistor configured to connect the first transistor to the first and second mode transistors in response to an emission signal having a plurality of emission cycles each including an emission-off period and an emission-on period in one frame period. The panel driver stepwise changes an on-duty of each of the first signal and the second signal over a plurality of frame periods in response to the mode switching signal. The number of steps in which the on-duty changes is determined based on the number of the emission cycles of the emission signal in one frame period.

According to some embodiments, the on-duty may change on one frame period basis, and the number of the steps in which the on-duty changes may be equal to the number of the emission cycles of the emission signal in one frame period.

According to some embodiments, the on-duty changes on N frame periods basis, where N is a natural number greater than or equal to 2, and the number of the steps in which the on-duty changes may be equal to a value obtained by multiplying N by the number of the emission cycles of the emission signal in one frame period.

According to some embodiments, the on-duty uniformly may change in the steps in which the on-duty changes.

According to some embodiments, the electronic device may be an automotive electronic device mounted on an automobile, and when the automobile changes from a stationary state to a moving state, the processor may transmit the mode switching signal, which indicates a switching from a public mode in which an image displayed from the display device is viewed by both a first user positioned on a front of the display device and a second user positioned on a side of the display device to a private mode in which an image displayed from the display device is viewed by the first user and not viewed by the second user, to the panel driver.

According to some embodiments, when the automobile changes from the moving state to the stationary state, the processor may transmit the mode switching signal, which indicates a switching from the private mode to the public mode, to the panel driver.

According to some embodiments, the first viewing angle may be a wide viewing angle, and the second viewing angle may be a narrow viewing angle narrower than the first viewing angle.

According to some embodiments, the first light-emitting element may be a public light-emitting element in which light emitted from the first light-emitting element is provided to both a first user which is positioned on a front of the display device and a second user which is positioned on a side of the display device, and the second light-emitting element may be a private light-emitting element in which light emitted from the second light-emitting element is provided to the first user and not provided to the second user.

According to some embodiments, when the mode switching signal indicates a switching from a public mode to a private mode, the panel driver may stepwise decrease an on-duty of the first signal and may stepwise increase an on-duty of the second signal over a plurality of first frame periods, and when the mode switching signal indicates a switching from the private mode to the public mode, the panel driver may stepwise increase the on-duty of the first signal and may stepwise decrease the on-duty of the second signal over a plurality of second frame periods.

According to some embodiments, each of the first signal and the second signal may be a global signal simultaneously (or concurrently) provided to the pixels.

In the display device and the electronic device according to some embodiments, the number of emission-off periods of the emission signals in an on-period of a global signal is the same when switching between the public mode and the private mode, so that a luminance difference between blocks of an image may not occur. Accordingly, a horizontal line of the image when switching between the public mode and the private mode may not be recognized, and the image quality may be relatively improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
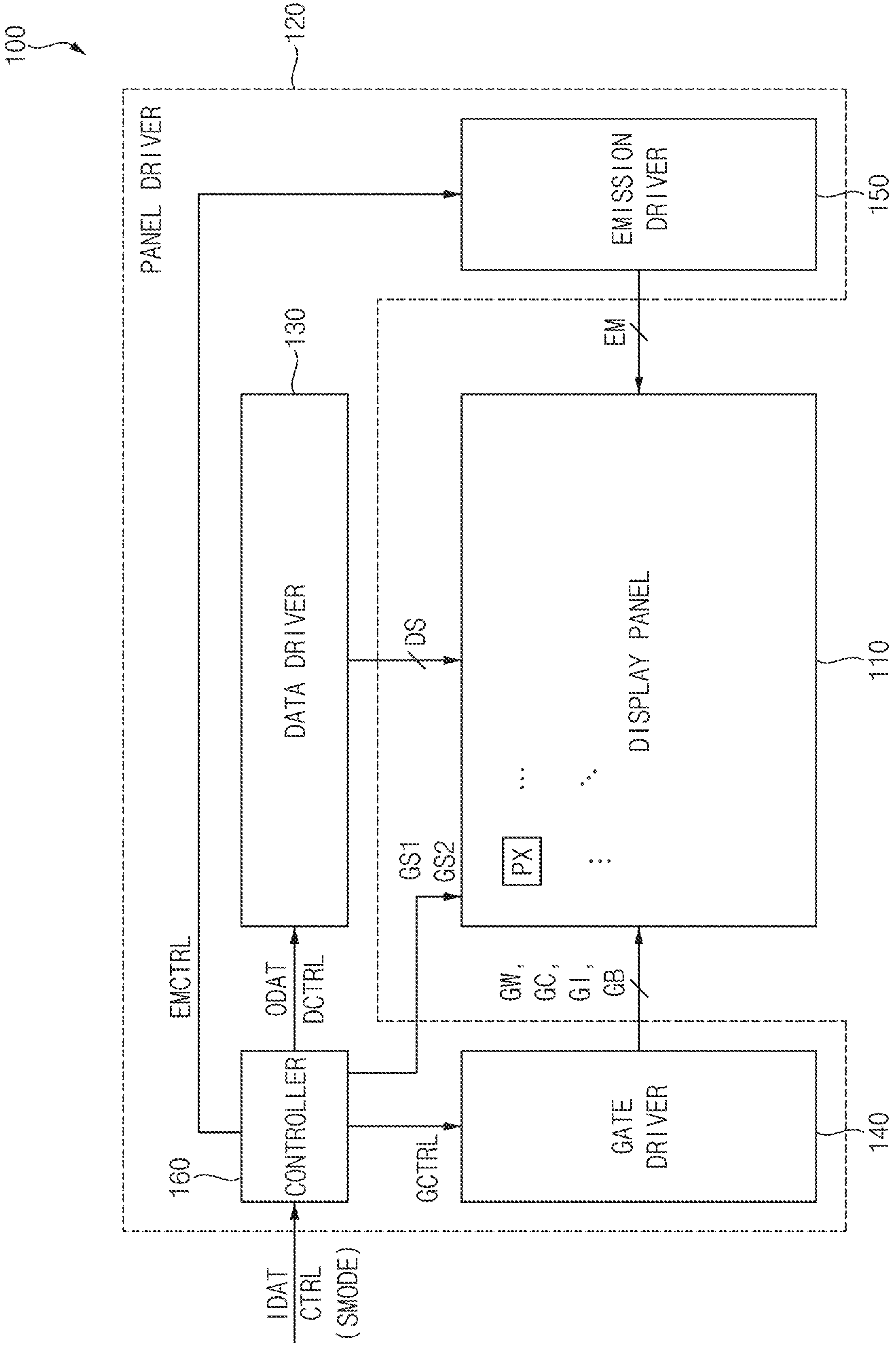
FIG. 1 is a block diagram illustrating a display device according to some embodiments.

Hereinafter, a display device and an electronic device according to some embodiments of the present disclosure will be described in more detail with reference to the accompanying drawings. The same or similar reference numerals will be used for the same elements in the accompanying drawings.

FIG. 1 is a block diagram illustrating a display device 100 according to some embodiments.

Referring to FIG. 1, the display device 100 may include a display panel 110 and a panel driver 120. The display panel 110 may include a plurality of pixels PX.

The panel driver 120 may drive the display panel 110. According to some embodiments, the panel driver 120 may include a data driver 130, a gate driver 140, an emission driver 150, and a controller 160.

The data driver 130 may provide data signals DS to the pixels PX. The data driver 130 may generate the data signals DS based on output image data ODAT and a data control signal DCTRL received from the controller 160. According to some embodiments, the data control signal DCTRL may include, but is not limited to, an output data enable signal, a horizontal start signal, and a load signal. According to some embodiments, the data driver 130 and the controller 160 may be implemented as a single integrated circuit, which may be referred to as a timing controller embedded data driver TED. According to some embodiments, the data driver 130 and the controller 160 may be implemented as separate integrated circuits.

The gate driver 140 may provide gate signals to the pixels PX. The gate driver 140 may generate the gate signals based on a gate control signal GCTRL received from the controller 160. According to some embodiments, the gate control signal GCTRL may include, but is not limited to, a gate start signal and a gate clock signal. According to some embodiments, the gate signals may be scan signals that are sequentially provided to the pixels PX on a pixel row basis. According to some embodiments, the gate signals may include first gate signals GW, second gate signals GC, third gate signals GI, and fourth gate signals GB. According to some embodiments, the gate driver 140 may be integrated or formed in the display panel 110. According to some embodiments, the gate driver 140 may be implemented as an integrated circuit.

The emission driver 150 may provide emission signals EM to the pixels PX. The emission driver 150 may generate the emission signals EM based on an emission control signal EMCTRL received from the controller 160. According to some embodiments, the emission control signal EMCTRL may include, but is not limited to, an emission start signal and an emission clock signal. According to some embodiments, the emission signals EM may be scan signals that are sequentially provided to the pixels PX on a pixel row basis. According to some embodiments, the emission driver 150 may be integrated or formed in the display panel 110. According to some embodiments, the emission driver 150 may be implemented as an integrated circuit.

The controller 160 (e.g., a timing controller) may receive input image data IDAT and a control signal CTRL from an external processor (e.g., an application processor AP, a graphics processing unit GPU, a graphics card, etc.). According to some embodiments, the control signal CTRL may include, but is not limited to, a vertical synchronization signal, a horizontal synchronization signal, an input data enable signal, a master clock signal, etc. The controller 160 may generate the output image data ODAT, the data control signal DCTRL, the gate control signal GCTRL, and the emission control signal EMCTRL based on the input image data IDAT and the control signal CTRL, may control the data driver 130 by providing the output image data ODAT and the data control signal DCTRL to the data driver 130, may control the gate driver 140 by providing the gate control signal GCTRL to the gate driver 140, and may control the emission driver 150 by providing the emission control signal EMCTRL to the emission driver 150.

The control signal CTRL may include a mode switching signal SMODE that indicates a switching from a first mode to a second mode. The controller 160 may generate a first signal GS1 and a second signal GS2 based on the mode switching signal SMODE. According to some embodiments, each of the first signal GS1 and the second signal GS2 may be a global signal simultaneously (or concurrently) (or substantially simultaneously or concurrently) provided to the pixels PX.

According to some embodiments, the first and second signals GS1 and GS2 may be provided directly to the pixels PX from the controller 160. According to some embodiments, the display device 100 may further include a level shifter (or a level shifter integrated circuit) that converts voltage levels of the first and second signals GS1 and GS2 into voltage levels suitable for the pixels PX, and the first and second signals GS1 and GS2 may be provided from the controller 160 to the pixels PX through the level shifter. According to some embodiments, the display device 100 may further include a power management circuit (or a power management integrated circuit), and the first and second signals GS1 and GS2 may be provided from the controller 160 to the pixels PX through the power management circuit. According to some embodiments, the first and second signals GS1 and GS2 may be provided from the controller 160 to the pixels PX through the level shifter and the power management circuit.

Figure 2:
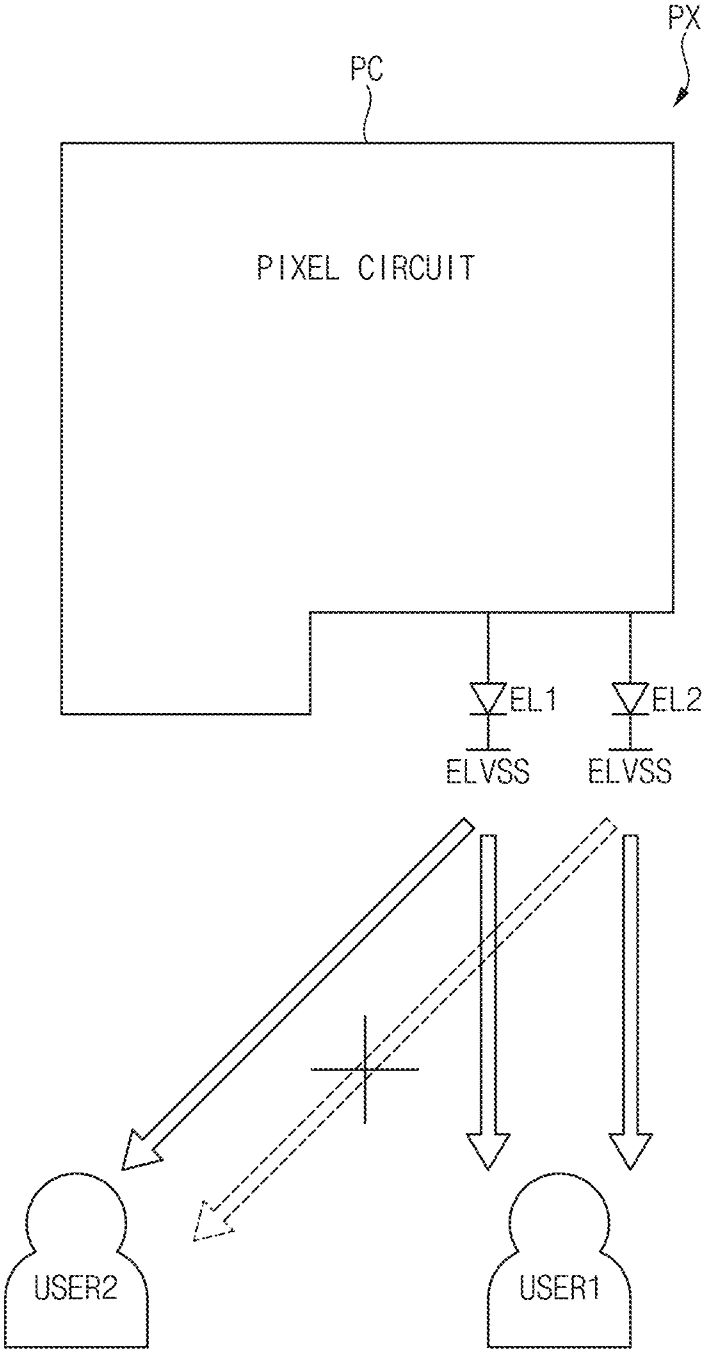
FIG. 2 is a diagram illustrating a pixel of FIG. 1.
Figure 3:
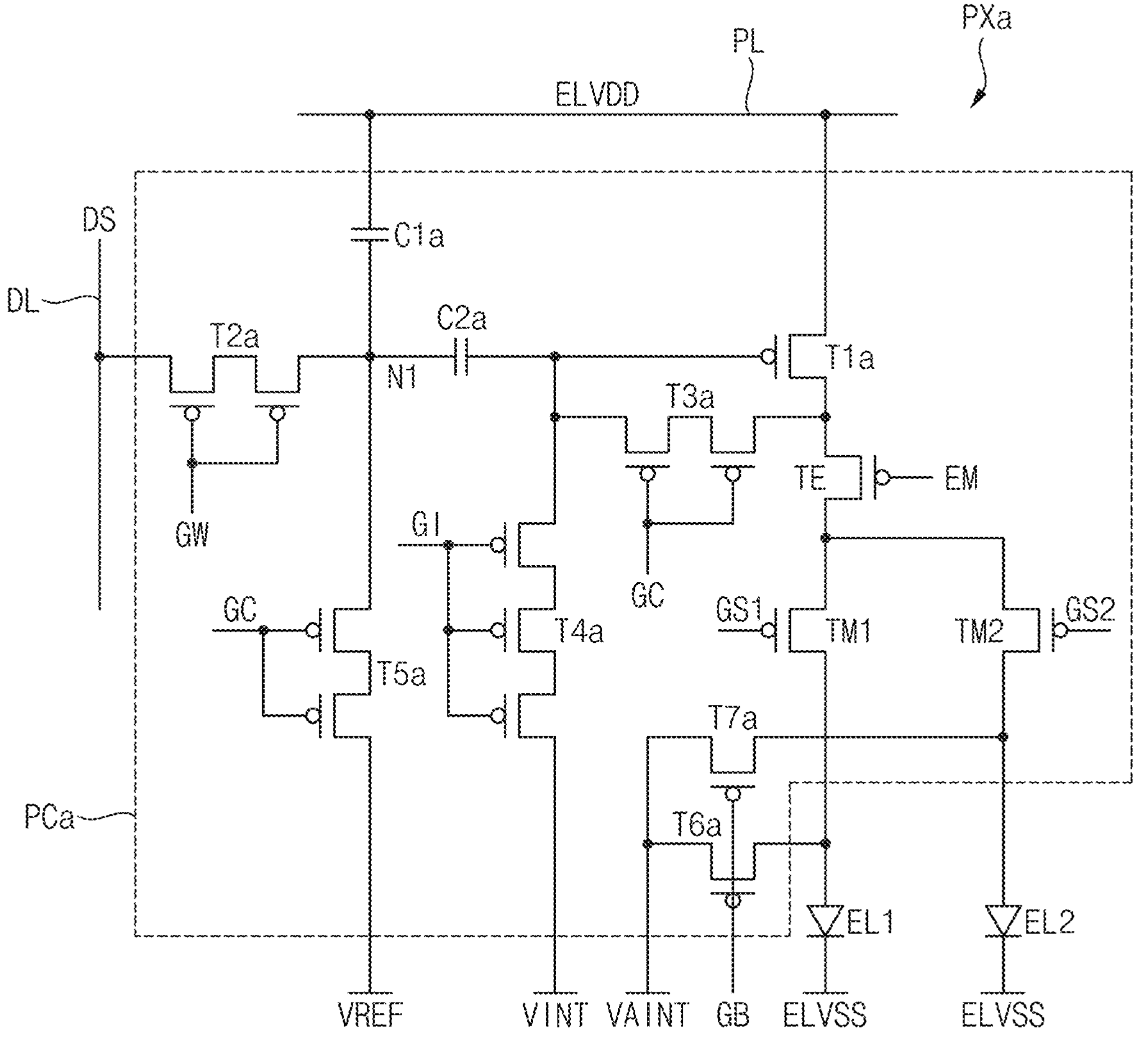
FIG. 3 is a circuit diagram illustrating an example of the pixel of FIG. 2.

FIG. 2 is a diagram illustrating the pixel PX of FIG. 1. FIG. 3 is a circuit diagram illustrating an example of the pixel PX of FIG. 2. Although FIG. 3 illustrates various components in a circuit diagram, embodiments according to the present disclosure are not limited thereto, and according to various embodiments, the circuit may include additional components, or fewer components, without departing from the spirit and scope of embodiments according to the present disclosure.

Referring to FIGS. 1 to 3, the pixel PX may include a first light-emitting element EL1, a second light-emitting element EL2, and a pixel circuit PC.

The first light-emitting element EL1 may include a first terminal (e.g., an anode) connected to the pixel circuit PC and a second terminal (e.g., a cathode) that receives a second power voltage ELVSS. The second light-emitting element EL2 may include a first terminal (e.g., an anode) connected to the pixel circuit PC and a second terminal (e.g., a cathode) that receives the second power voltage ELVSS.

The first light-emitting element EL1 may have a first viewing angle. The second light-emitting element EL2 may have a second viewing angle different from the first viewing angle. According to some embodiments, the first viewing angle may be a wide viewing angle, and the second viewing angle may be a narrow viewing angle less than the first viewing angle.

According to some embodiments, the first light-emitting element EL1 may be a public light-emitting element in which light emitted from the first light-emitting element EL1 is provided to both a first user USER1 positioned on a front of the display device 100 and a second user USER2 positioned on a side of the display device 100. A mode of the display device 100 in which images displayed on the display device 100 is visible to both the first user USER1 positioned on the front of the display device 100 and the second user USER2 positioned on the side of the display device 100 may be referred to as a public mode.

According to some embodiments, the second light-emitting element EL2 may be a private light-emitting element in which light emitted from the second light-emitting element EL2 is provided to the first user USER1 positioned on a front of the display device 100 and not to the second user USER2 positioned on the side of the display device 100. A mode of the display device 100 in which images are displayed on the display device 100 is visible to the first user USER1 positioned on the front of the display device 100 and not visible to the second user USER2 positioned on the side of the display device 100 may be referred to as a private mode.

According to some embodiments, each of the first and second light-emitting elements EL1 and EL2 may be an organic light-emitting diode OLED, but is not limited thereto. According to some embodiments, each of the first and second light-emitting elements EL1 and EL2 may be any suitable light-emitting element. For example, each of the first and second light-emitting elements EL1 and EL2 may be a micro light-emitting diode, a nano light-emitting diode NED, a quantum dot QD light-emitting diode, an inorganic light-emitting diode, or any other suitable light-emitting element.

The pixel circuit PC may generate a driving current based on a first gate signal GW, a second gate signal GC, a third gate signal GI, a fourth gate signal GB, an emission signal EM, and a data signal DS. The pixel circuit PC may provide the driving current to the first light-emitting element EL1 or the second light-emitting element EL2.

According to some embodiments, as illustrated in FIG. 3, the pixel PXa may include the first light-emitting element EL1, the second light-emitting element EL2, and a pixel circuit PCa, and the pixel circuit PCa may include a first transistor T1*a*, a first mode transistor TM1, a second mode transistor TM2, an emission transistor TE, a second transistor T2*a*, a third transistor T3*a*, a fourth transistor T4*a*, a fifth transistor T5*a*, a sixth transistor T6*a*, a seventh transistor T7*a*, a first capacitor C1*a*, and a second capacitor C2*a*.

The first transistor T1*a* may be a driving transistor that generates the driving current. According to some embodiments, the first transistor T1*a* may include a gate, a first terminal (e.g., a source) connected to a power line PL that transmits a first power voltage ELVDD, and a second terminal (e.g., a drain).

The first mode transistor TM1 may provide the driving current to the first light-emitting element EL1 in response to the first signal GS1. According to some embodiments, the first mode transistor TM1 may include a gate that receives the first signal GS1, a first terminal (e.g., a source), and a second terminal (e.g., a drain) connected to the first terminal of the first light-emitting element EL1.

The second mode transistor TM2 may provide the driving current to the second light-emitting element EL2 in response to the second signal GS2. According to some embodiments, the second mode transistor TM2 may include a gate that receives the second signal GS2, a first terminal (e.g., a source), and a second terminal (e.g., a drain) connected to the first terminal of the second light-emitting element EL2.

The emission transistor TE may connect the first transistor T1*a* to the first and second mode transistors TM1 and TM2 in response to the emission signal EM. According to some embodiments, the emission transistor TE may include a gate that receives the emission signal EM, a first terminal (e.g., a source) connected to the second terminal of the first transistor T1*a*, and a second terminal (e.g., a drain) connected to the first terminal of the first mode transistor TM1 and the first terminal of the second mode transistor TM2.

The second transistor T2*a* may transmit the data signal DS to a first node N1 in response to the first gate signal GW. According to some embodiments, the second transistor T2*a* may include a gate that receives the first gate signal GW, a first terminal (e.g., a source) connected to a data line DL that transmits the data signal DS, and a second terminal (e.g., a drain) connected to the first node N1.

The third transistor T3*a* may connect the gate and the second terminal of the first transistor T1*a* in response to the second gate signal GC. According to some embodiments, the third transistor T3*a* may include a gate that receives the second gate signal GC, a first terminal (e.g., a source) connected to the second terminal of the first transistor T1*a*, and a second terminal (e.g., a drain) connected to the gate of the first transistor T1*a*.

The fourth transistor T4*a* may transmit a first initialization voltage VINT to the gate of the first transistor T1*a* in response to the third gate signal GI. According to some embodiments, the fourth transistor T4*a* may include a gate that receives the third gate signal GI, a first terminal (e.g., a source) that receives the first initialization voltage VINT, and a second terminal (e.g., a drain) connected to the gate of the first transistor T1*a*.

The fifth transistor T5*a* may transmit a reference voltage VREF to the first node N1 in response to the second gate signal GC. According to some embodiments, the fifth transistor T5*a* may include a gate that receives the second gate signal GC, a first terminal (e.g., a source) that receives the reference voltage VREF, and a second terminal (e.g., a drain) connected to the first node N1.

The sixth transistor Toa may transmit a second initialization voltage VAINT to the first terminal of the first light-emitting element EL1 in response to the fourth gate signal GB. According to some embodiments, the sixth transistor T6*a* may include a gate that receives the fourth gate signal GB, a first terminal (e.g., a source) that receives the second initialization voltage VAINT, and a second terminal (e.g., a drain) connected to the first terminal of the first light-emitting element EL1.

The seventh transistor T7*a* may transmit the second initialization voltage VAINT to the first terminal of the second light-emitting element EL2 in response to the fourth gate signal GB. According to some embodiments, the seventh transistor T7*a* may include a gate that receives the fourth gate signal GB, a first terminal (e.g., a source) that receives the second initialization voltage VAINT, and a second terminal (e.g., a drain) connected to the first terminal of the second light-emitting element EL2.

According to some embodiments, as illustrated in FIG. 3, the first and second mode transistors TM1 and TM2, the emission transistor TE, and the first to seventh transistors Ta to T7*a* may be p-type metal oxide semiconductor PMOS transistors. According to some embodiments, at least one of the first or second mode transistors TM1 or TM2, the emission transistor TE, or the first to seventh transistors T1*a* to T7*a* may be an n-type metal oxide semiconductor NMOS transistor.

According to some embodiments, at least one of the first or second mode transistors TM1 or TM2, the emission transistor TE, or the first to seventh transistors T1*a* to T7*a* may include a plurality of sub-transistors connected in series. For example, as illustrated in FIG. 3, each of the second, third, and fifth transistors T2*a*, T3*a*, and T5*a* may include two sub-transistors connected in series, and the fourth transistor T4*a* may include three sub-transistors connected in series.

The first capacitor C1*a* may be connected between the power line PL and the first node N1. For example, the first capacitor C1*a* may be a storage capacitor. The first capacitor C1*a* may store the data signal DS transmitted to the first node N1 via the second transistor T2*a*.

The second capacitor C2*a* may be connected between the first node N1 and the gate of the first transistor T1*a*. For example, the second capacitor C2*a* may be a hold capacitor. When a voltage of the first node N1 changes from the reference voltage VREF to the data signal DS, a voltage of the gate of the first transistor T1*a* may change by a voltage corresponding to a voltage difference between the reference voltage VREF and the data signal DS.

When the first signal GS1 has an on-level (e.g., a low level) and the second signal GS2 has an off-level (e.g., a high level), the first mode transistor TM1 may be turned on and the second mode transistor TM2 may be turned off. As the first mode transistor TM1 is turned on and the second mode transistor TM2 is turned off, the driving current generated in the pixel circuit PC may be provided to the first light-emitting element EL1, and the first light-emitting element EL1 having a wide viewing angle may emit light based on the driving current. While the first signal GS1 has the on-level and the second signal GS2 has the off-level, the display device 100 may operate in the public mode.

When the first signal GS1 has the off-level and the second signal GS2 has the on-level, the first mode transistor TM1 may be turned off and the second mode transistor TM2 may be turned on. As the first mode transistor TM1 is turned off and the second mode transistor TM2 is turned on, the driving current generated in the pixel circuit PC may be provided to the second light-emitting element EL2, and the second light-emitting element EL2 having a narrow viewing angle may emit light based on the driving current. While the first signal GS1 has the off-level and the second signal GS2 has the on-level, the display device 100 may operate in the private mode.

Figure 4:
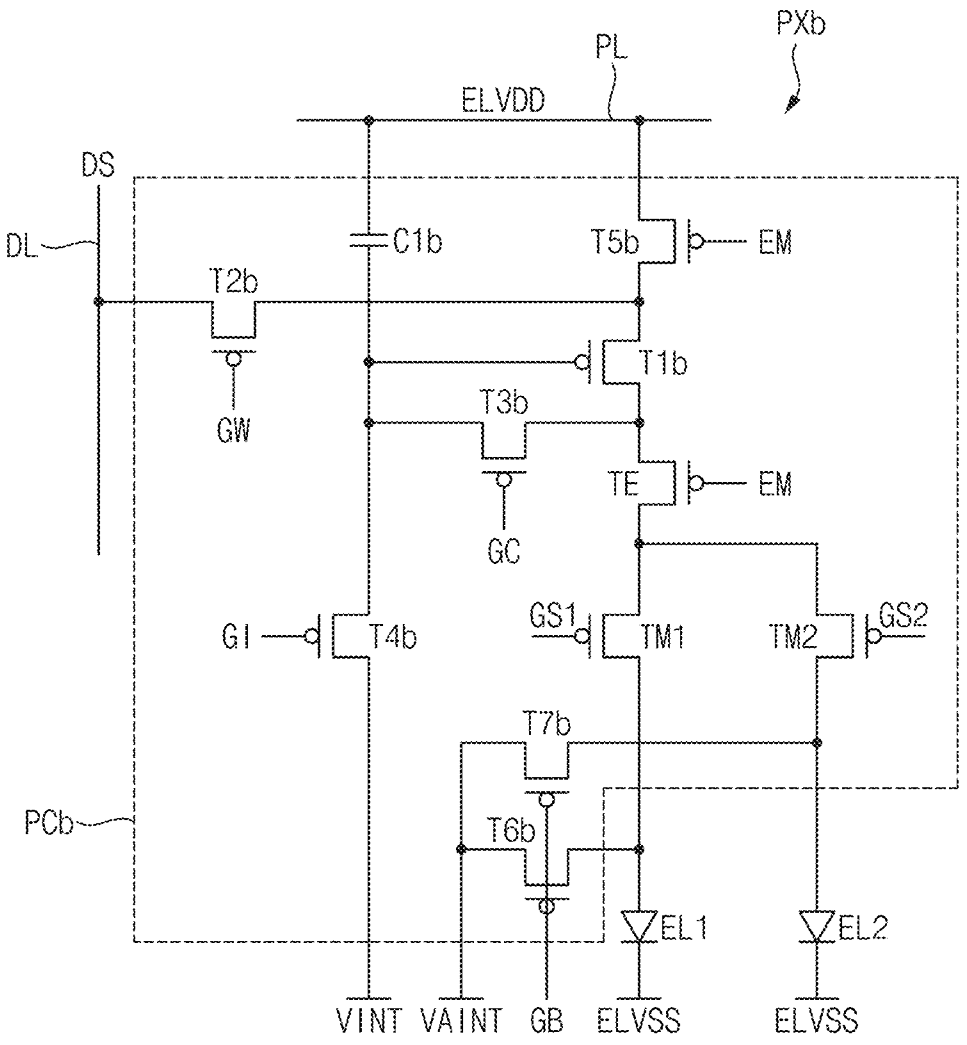
FIG. 4 is a circuit diagram illustrating an example of the pixel of FIG. 2.

FIG. 4 is a circuit diagram illustrating an example of the pixel PX of FIG. 2. Although FIG. 4 illustrates various components in a circuit diagram, embodiments according to the present disclosure are not limited thereto, and according to various embodiments, the circuit may include additional components, or fewer components, without departing from the spirit and scope of embodiments according to the present disclosure.

Referring to FIGS. 1, 2, and 4, according to some embodiments, as illustrated in FIG. 4, the pixel PXb may include the first light-emitting element EL1, the second light-emitting element EL2, and a pixel circuit PCb, and the pixel circuit PCb may include a first transistor T1*b*, a first mode transistor TM1, a second mode transistor TM2, an emission transistor TE, a second transistor T2*b*, a third transistor T3*b*, a fourth transistor T4*b*, a fifth transistor T5*b*, a sixth transistor T6*b*, a seventh transistor T7*b*, and a first capacitor C1*b*.

Some description of components of the pixel PXb described with reference to FIG. 4, which are the same (or substantially the same) as or similar to those of the pixel PXa described with reference to FIG. 3, may be omitted.

The first transistor T1*b* may be a driving transistor that generates the driving current. According to some embodiments, the first transistor T1*b* may include a gate, a first terminal (e.g., a source), and a second terminal (e.g., a drain).

The emission transistor TE may connect the first transistor T1*b* to the first and second mode transistors TM1 and TM2 in response to the emission signal EM. According to some embodiments, the emission transistor TE may include a gate that receives the emission signal EM, a first terminal (e.g., a source) connected to the second terminal of the first transistor T1*b*, and a second terminal (e.g., a drain) connected to the first terminal of the first mode transistor TM1 and the first terminal of the second mode transistor TM2.

The second transistor T2*b* may transmit the data signal DS to the first terminal of the first transistor T1*b* in response to the first gate signal GW. According to some embodiments, the second transistor T2*b* may include a gate that receives the first gate signal GW, a first terminal (e.g., a source) connected to a data line DL that transmits the data signal DS, and a second terminal (e.g., a drain) connected to the first terminal of the first transistor T1*b*.

The third transistor T3*b* may connect the gate and the second terminal of the first transistor T1*b* in response to the second gate signal GC. According to some embodiments, the third transistor T3*b* may include a gate that receives the second gate signal GC, a first terminal (e.g., a source) connected to the second terminal of the first transistor T1*b*, and a second terminal (e.g., a drain) connected to the gate of the first transistor T1*b*.

The fourth transistor T4*b* may transmit a first initialization voltage VINT to the gate of the first transistor T1*b* in response to the third gate signal GI. According to some embodiments, the fourth transistor T4*b* may include a gate that receives the third gate signal GI, a first terminal (e.g., a source) that receives the first initialization voltage VINT, and a second terminal (e.g., a drain) that is connected to the gate of the first transistor T1*b*.

The fifth transistor T5*b* may transmit a first power voltage ELVDD to the first terminal of the first transistor T1*b* in response to the emission signal EM. According to some embodiments, the fifth transistor T5*b* may include a gate that receives the emission signal EM, a first terminal (e.g., a source) that receives the first power voltage ELVDD, and a second terminal (e.g., a drain) connected to the first terminal of the first transistor T1*b*.

The sixth transistor T6*b* may transmit a second initialization voltage VAINT to the first terminal of the first light-emitting element EL1 in response to the fourth gate signal GB. According to some embodiments, the sixth transistor T6*b* may include a gate that receives the fourth gate signal GB, a first terminal (e.g., a source) that receives the second initialization voltage VAINT, and a second terminal (e.g., a drain) connected to the first terminal of the first light-emitting element EL1.

The seventh transistor T7*b* may transmit the second initialization voltage VAINT to the first terminal of the second light-emitting element EL2 in response to the fourth gate signal GB. According to some embodiments, the seventh transistor T7*b* may include a gate that receives the fourth gate signal GB, a first terminal (e.g., a source) that receives the second initialization voltage VAINT, and a second terminal (e.g., a drain) connected to the first terminal of the second light-emitting element EL2.

According to some embodiments, as illustrated in FIG. 4, the first and second mode transistors TM1 and TM2, the emission transistor TE, and the first to seventh transistors T1*b* to T7*b* may be PMOS transistors. According to some embodiments, at least one of the first and second mode transistors TM1 and TM2, the emission transistor TE, or the first to seventh transistors T1*b* to T7*b* may be an NMOS transistor.

According to some embodiments, at least one of the first and second mode transistors TM1 and TM2, the emission transistor TE, or the first to seventh transistors T1*b* to T7*b* may include a plurality of sub-transistors connected in series.

Figure 5:
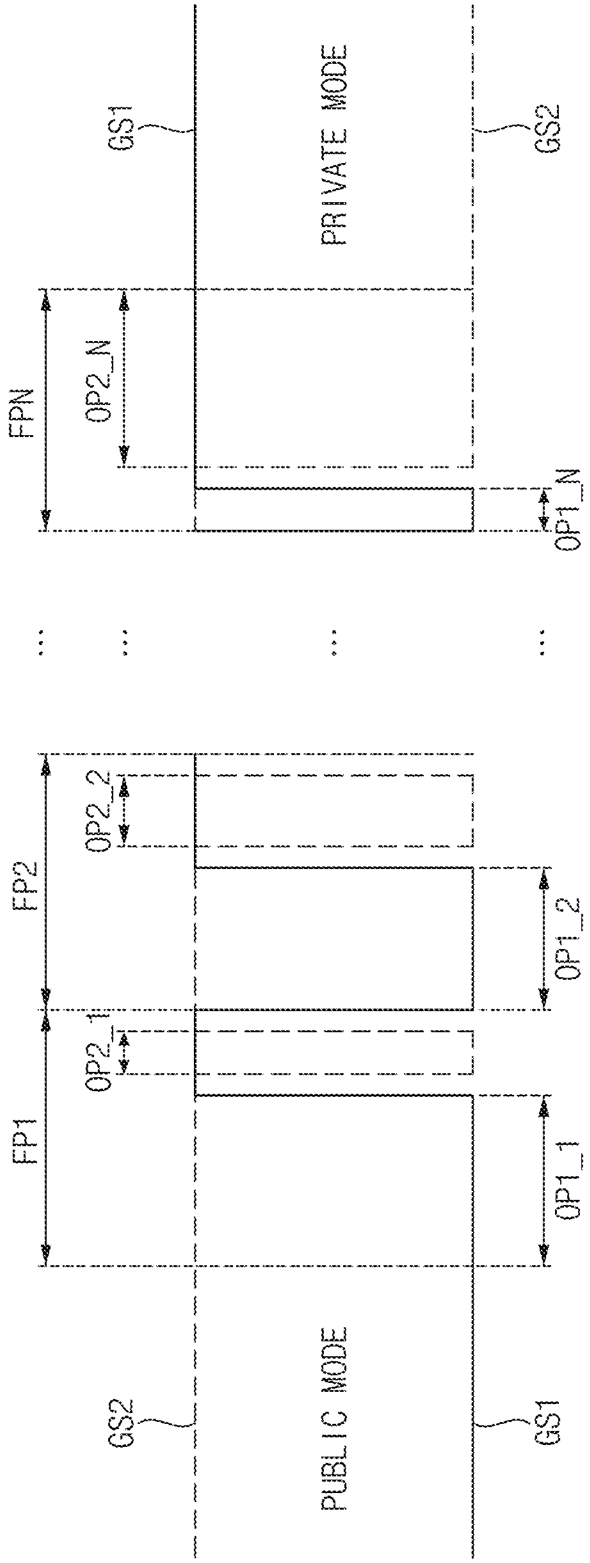
FIG. 5 is a timing diagram illustrating a first signal and a second signal when a mode of the display device of FIG. 1 is switched from a public mode to a private mode.

FIG. 5 is a timing diagram illustrating the first signal GS1 and the second signal GS2 when a mode of the display device 100 of FIG. 1 is switched from the public mode to the private mode.

Referring to FIGS. 1 and 5, the panel driver 120 (or the controller 160) may change an on-duty of each of the first signal GS1 and the second signal GS2 stepwise or gradually over a plurality of frame periods in response to the mode switching signal SMODE that indicates a switching from the first mode to the second mode. Here, an on-duty of the first signal GS1 may represent a ratio of a time length of an on-period (e.g., a low period) of the first signal GS1 to a time length of the frame period, and an on-duty of the second signal GS2 may represent a ratio of a time length of an on-period of the second signal GS2 to the time length of the frame period. Accordingly, when the mode of the display device 100 is switched from the first mode to the second mode, a mode switching of the display device 100 may be performed smoothly.

For example, as illustrated in FIG. 5, when the mode switching signal SMODE indicates a switching from the public mode to the private mode, the panel driver 120 (or the controller 160) may stepwise decrease the on-duty of the first signal GS1 and may stepwise increase the on-duty of the second signal GS2 over a plurality of frame periods FP1, FP2, . . . , FPN.

In the example of FIG. 5, the first signal GS1 may have a first on-period OP1_1 shorter than a first frame period FP1 in the first frame period FP1, a second on-period OP1_2 shorter than the first on-period OP1_1 in a second frame period FP2, and an $N^{th}$ on-period OP1_N shorter than an $N-1^{th}$ on-period in an $N^{th}$ frame period FPN. Further, in the example of FIG. 5, the second signal GS2 may have a first on-period OP2_1 shorter than the first frame period FP1 in the first frame period FP1, a second on-period OP2_2 longer than the first on-period OP2_1 in the second frame period FP2, and an $N^{th}$ on-period OP2_N longer than an $N-1^{th}$ on-period in the $N^{th}$ frame period FPN. Because the on-periods OP1_1, OP1_2, . . . , OP1_N of the first signal GS1 decrease stepwise in the plurality of frame periods FP1, FP2, . . . , FPN, time periods in which the first light-emitting elements EL1 of the pixels PX emit light may decrease stepwise in the plurality of frame periods FP1, FP2, . . . , FPN. Further, because the on-periods OP2_1, OP2_2, . . . , OP2_N of the second signal GS2 increase stepwise in the plurality of frame periods FP1, FP2, . . . , FPN, time periods in which the second light-emitting elements EL2 of the pixels PX emit light may increase stepwise in the plurality of frame periods FP1, FP2, . . . , FPN.

For example, when the mode switching signal SMODE indicates that a switching from the private mode to the public mode, the panel driver 120 (or the controller 160) may stepwise increase the on-duty of the first signal GS1 and may stepwise decrease the on-duty of the second signal GS2 over the plurality of frame periods FP1, FP2, . . . , FPN.

Figure 6:
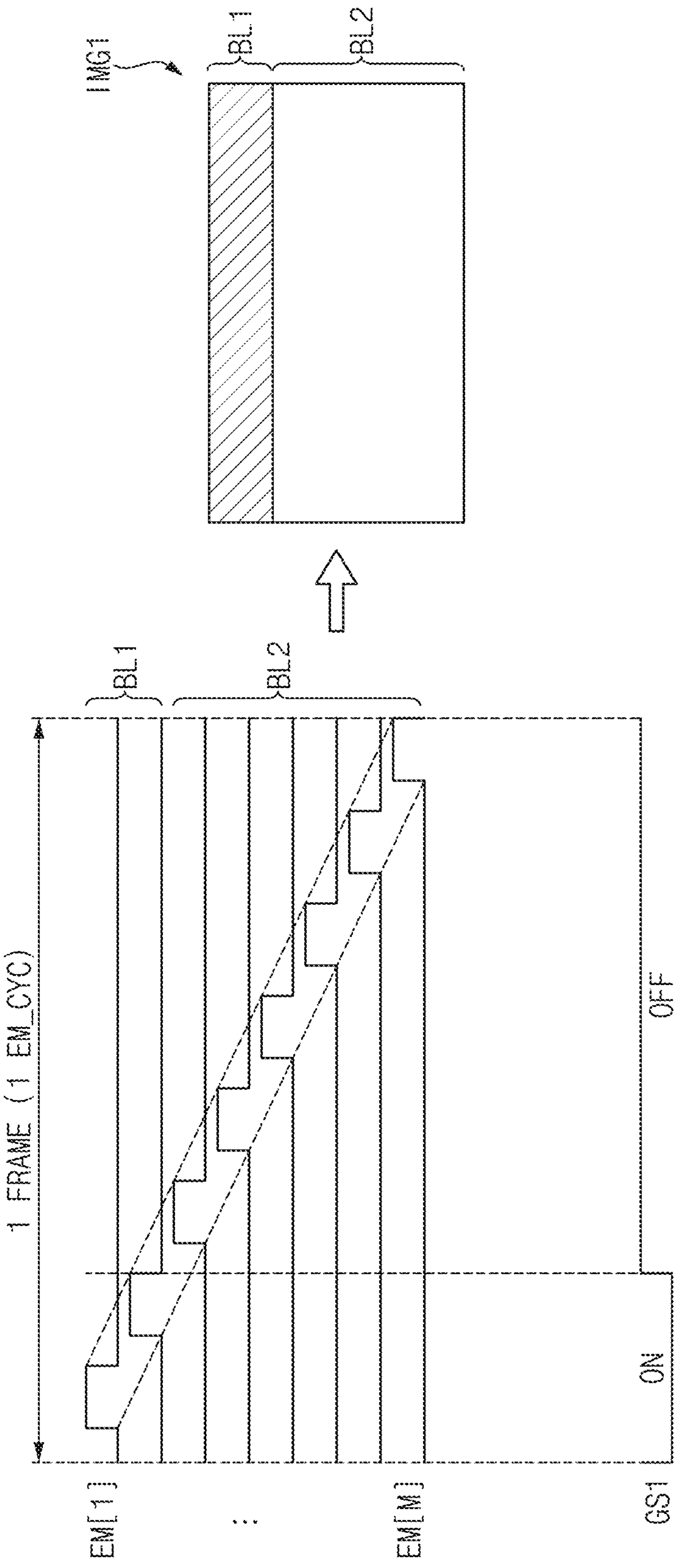
FIG. 6 is a diagram for describing an example of a luminance difference between blocks of an image depending on whether an on-period of the first signal and emission-off periods of emission signals having one emission cycle overlap.
Figure 7:
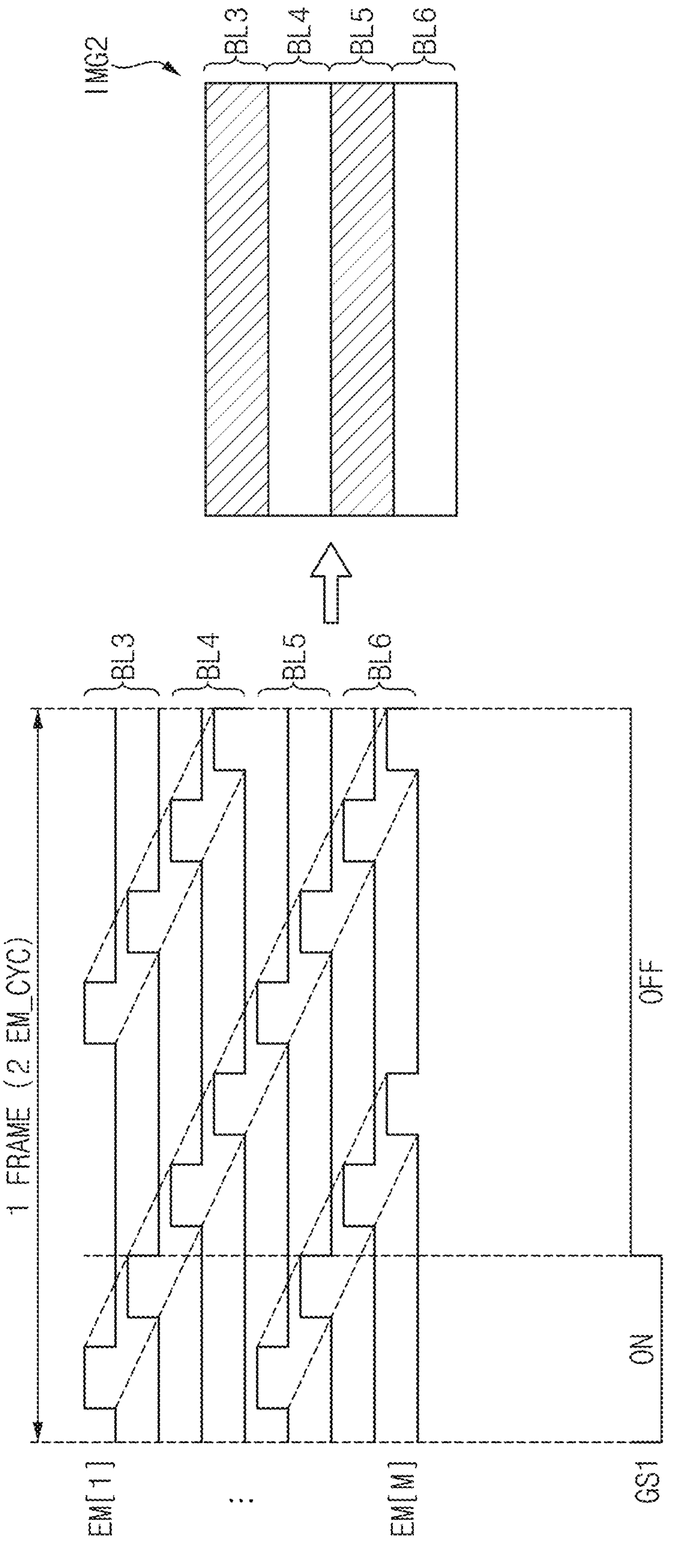
FIG. 7 is a diagram for describing an example of a luminance difference between blocks of an image depending on whether an on-period of the first signal and emission-off periods of emission signals having two emission cycles overlap.

FIG. 6 is a diagram for describing an example of a luminance difference between blocks BL1 and BL2 of an image IMG1 depending on whether an on-period ON of the first signal GS1 and emission-off periods of emission signals EM[1], . . . , EM[M] having one emission cycle EM_CYC overlap. FIG. 7 is a diagram for describing an example of a luminance difference between blocks BL3, BL4, BL5, and BL6 of an image IMG2 depending on whether an on-period ON of the first signal GS1 and emission-off periods of emission signals EM[1], . . . , EM[M] having two emission cycles EM_CYC overlap.

Referring to FIGS. 3, 4, 6 and 7, each of the emission signals EM[1], . . . , EM[M] may have at least one emission cycle EM_CYC in one frame period. The emission cycle EM_CYC may include an emission-off period and an emission-on period following the emission-off period. The emission-off period may be a period in which the emission signal EM has an off-level (e.g., a high level), and the emission-on period may be a period in which the emission signal EM has an on-level (e.g., a low level).

When the on-period ON of the first signal GS1 and the emission-off period of the emission signal EM do not overlap (when the on-period ON of the first signal GS1 and the emission-on period of the emission signal EM overlap), both the emission transistor TE and the first mode transistor TM1 are turned on, so that the driving current generated in the first transistor T1*a* and T1*b* may be provided to the first light-emitting element EL1 through the emission transistor TE and the first mode transistor TM1, and the first light-emitting element EL1 may emit light based on the driving current. When the on-period ON of the first signal GS1 and the emission-off period of the emission signal EM overlap, even if the first mode transistor TM1 is turned on, the emission transistor TE is turned off, so the driving current generated in the first transistor T1*a* and T1*b* may not be provided to the first light-emitting element EL1, and the first light-emitting element EL1 may not emit light.

For example, as illustrated in FIG. 6, when each of the emission signals EM[1], . . . , EM[M] has one emission cycle EM_CYC, the first light-emitting elements EL1 of the pixels PXa and PXb positioned in the a block BL1 in which the emission-off periods of the emission signals EM[1], . . . overlap the on-period ON of the first signal GS1 may emit light with a relatively low luminance, and the first light-emitting elements EL1 of the pixels PXa and PXb positioned in a second block BL2 in which the emission-off periods of the emission signals . . . , EM[M] overlap the off-period OFF of the first signal GS1 may emit light with a relatively high luminance. Accordingly, a luminance of the first block BL1 of the image IMG1 may be lower than a luminance of the second block BL2 of the image IMG1, and a luminance difference may occur between the blocks BL1 and BL2 of the image IMG1. For example, as illustrated in FIG. 6, during a switching process between the public mode and the private mode, a horizontal line may be recognized in the image IMG1, and the image quality may deteriorate.

For example, as illustrated in FIG. 7, when each of the emission signals EM[1], . . . , EM[M] has two emission cycles EM_CYC, the first light-emitting elements EL1 of the pixels PXa and PXb positioned in third and fifth blocks BL3 and BL5 in which the emission-off periods of the emission signals EM[1], . . . overlap the on-period ON of the first signal GS1 may emit light with a relatively low luminance, and the first light-emitting elements EL1 of the pixels PXa and PXb positioned in fourth and sixth blocks BL4 and BL6 in which the emission-off periods of the emission signals . . . , EM[M] overlap the off-period OFF of the first signal GS1 may emit light with a relatively high luminance. Accordingly, a luminance of the third and fifth blocks BL3 and BL5 of the image IMG2 may be lower than a luminance of the fourth and sixth blocks BL4 and BL6 of the image IMG2, and a luminance difference may occur between the blocks BL3, BL4, BL5, and BL6 of the image IMG2. For example, as illustrated in FIG. 7, during a switching process between the public mode and the private mode, two horizontal lines may be recognized in the image IMG2, and the image quality may deteriorate.

Figure 8:
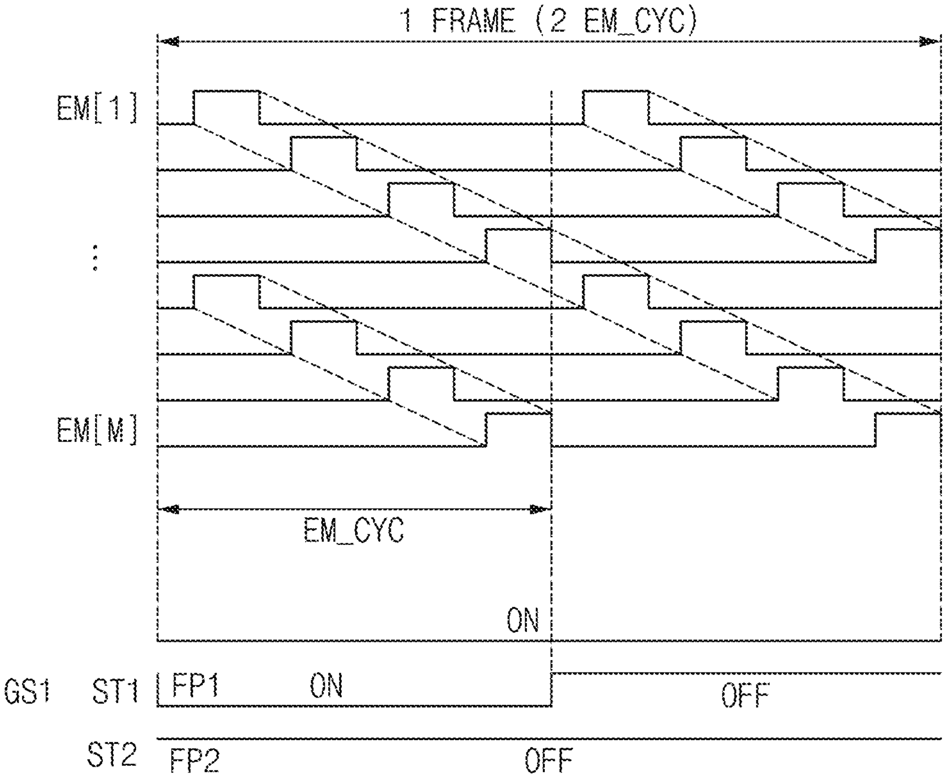
FIG. 8 is a timing diagram illustrating an example in which an on-duty of the first signal changes stepwise when the emission signals have two emission cycles.
Figure 9:
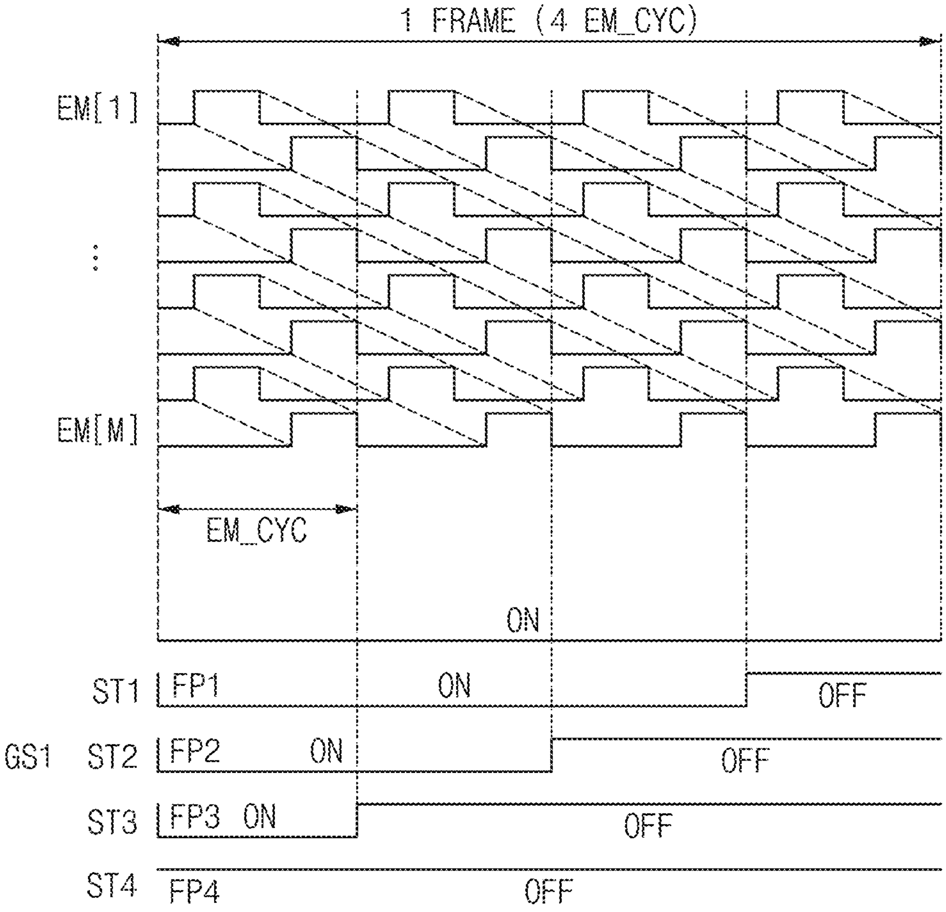
FIG. 9 is a timing diagram illustrating an example in which an on-duty of the first signal changes stepwise when the emission signals have four emission cycles.

FIG. 8 is a timing diagram illustrating an example in which the on-duty of the first signal GS1 changes stepwise when the emission signals EM[1], . . . , EM[M] have two emission cycles EM_CYC. FIG. 9 is a timing diagram illustrating an example in which the on-duty of the first signal GS1 changes stepwise when the emission signals EM[1], . . . , EM[M] have four emission cycles EM_CYC.s Referring to FIGS. 1, 8, and 9, the panel driver 120 (or the controller 160) may determine the number of steps in which the on-duty of each of the first signal GS1 and the second signal GS2 changes based on the number of emission cycles EM_CYC of the emission signal EM in one frame period.

According to some embodiments, the on-duty of each of the first signal GS1 and the second signal GS2 may change on one frame period basis, and the number of steps in which the on-duty of each of the first signal GS1 and the second signal GS2 changes may be equal to the number of emission cycles EM_CYC of the emission signal EM in one frame period.

For example, as illustrated in FIG. 8, when the on-duty of the first signal GS1 changes on one frame period basis and the number of emission cycles EM_CYC of the emission signal EM in one frame period is two, the number of steps in which the on-duty of the first signal GS1 changes may be two. For example, when the mode of the display device 100 is switched from the public mode to the private mode, the on-duty of the first signal GS1 may decrease from 100% to 50% in a first step ST1 corresponding to a first frame period FP1, and the on-duty of the first signal GS1 may decrease from 50% to 0% in a second step ST2 corresponding to a second frame period FP2. The number of emission-off periods of each of the emission signals EM[1], . . . , EM[M] in the on-period ON of the first signal GS1 may be commonly one in the first frame period FP1. Accordingly, the luminance difference may not occur between the blocks of the image in the first frame period FP1.

In the example of FIG. 8, the number of steps in which the on-duty of the second signal GS2 changes may be two. For example, when the mode of the display device 100 is switched from the public mode to the private mode, the on-duty of the second signal GS2 may increase from 0% to 50% in the first step ST1 corresponding to the first frame period FP1, and the on-duty of the second signal GS2 may increase from 50% to 100% in the second step ST2 corresponding to the second frame period FP2.

For example, as illustrated in FIG. 9, when the on-duty of the first signal GS1 changes on one frame period basis and the number of emission cycles EM_CYC of the emission signal EM in one frame period is four, the number of steps in which the on-duty of the first signal GS1 changes may be four. For example, when the mode of the display device 100 is switched from the public mode to the private mode, the on-duty of the first signal GS1 may decrease from 100% to 75% in a first step ST1 corresponding to a first frame period FP1, the on-duty of the first signal GS1 may decrease from 75% to 50% in a second step ST2 corresponding to a second frame period FP2, the on-duty of the first signal GS1 may decrease from 50% to 25% in a third step ST3 corresponding to a third frame period FP3, and the on-duty of the first signal GS1 may decrease from 25% to 0% in a fourth step ST4 corresponding to a fourth frame period FP4. The number of emission-off periods of each of the emission signals EM[1], . . . , EM[M] in the on-period of the first signal GS1 may be commonly three in the first frame period FP1, the number of emission-off periods of each of the emission signals EM[1], . . . , EM[M] in the on-period of the first signal GS1 may be commonly two in the second frame period FP2, and the number of emission-off periods of each of the emission signals EM[1], . . . , EM[M] in the on-period of the first signal GS1 may be commonly one in the third frame period FP3. Accordingly, the luminance difference may not occur between the blocks of the image in each of the first to third frame periods FP1 to FP3.

In the example of FIG. 9, the number of steps in which the on-duty of the second signal GS2 changes may be four. For example, when the mode of the display device 100 is switched from the public mode to the private mode, the on-duty of the second signal GS2 may increase from 0% to 25% in the first step ST1 corresponding to the first frame period FP1, the on-duty of the second signal GS2 may increase from 25% to 50% in the second step ST2 corresponding to the second frame period FP2, the on-duty of the second signal GS2 may increase from 50% to 75% in the third step ST3 corresponding to the third frame period FP3, and the on-duty of the second signal GS2 may increase from 75% to 100% in the fourth step ST4 corresponding to the fourth frame period FP4.

According to some embodiments, the luminance difference does not occur between the blocks of the image in each of the frame periods during the process in which the mode of the display device 100 is switched between the public mode and the private mode, so that the image quality of the display device 100 may be improved. Further, according to some embodiments, the number of steps in which the on-duty of each of the first signal GS1 and the second signal GS2 changes is equal to the number of the emission cycles EM_CYC of the emission signal EM in one frame period, so that the mode switching of the display device 100 may be performed quickly.

According to some embodiments, the on-duty of each of the first signal GS1 and the second signal GS2 may uniformly change in the steps in which the on-duty changes. In the example of FIG. 8, the on-duty of the first signal GS1 may decrease by 50% for each frame period, and the on-duty of the second signal GS2 may increase by 50% for each frame period. In the example of FIG. 9, the on-duty of the first signal GS1 may decrease by 25% for each frame period, and the on-duty of the second signal GS2 may increase by 25% for each frame period.

Figure 10:
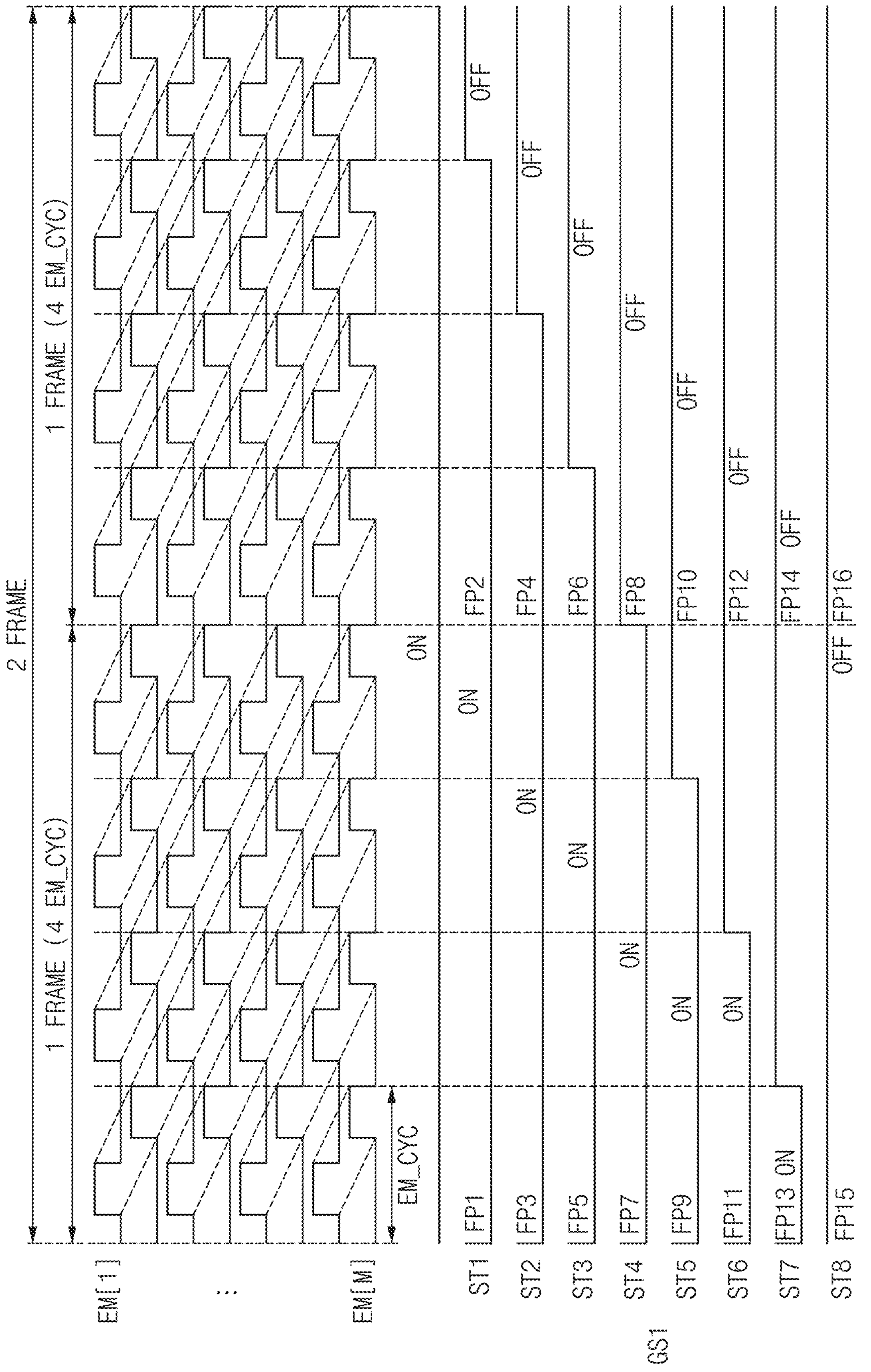
FIG. 10 is a timing diagram illustrating an example in which an on-duty of the first signal changes stepwise when the emission signals have four emission cycles.

FIG. 10 is a timing diagram illustrating an example in which the on-duty of the first signal GS1 changes stepwise when the emission signals EM[1], . . . , EM[M] have four emission cycles EM_CYC.

Referring to FIGS. 1 and 10, according to some embodiments, the on-duty of each of the first signal GS1 and the second signal GS2 may change on N frame periods basis, where N is a natural number greater than or equal to 2, and the number of steps in which the on-duty of each of the first signal GS1 and the second signal GS2 changes may be equal to a value obtained by multiplying N by the number of emission cycles EM_CYC of the emission signal EM in one frame period.

For example, as illustrated in FIG. 10, when the on-duty of the first signal GS1 changes on two frame periods basis and the number of emission cycles EM_CYC of the emission signal EM in one frame period is four, the number of steps in which the on-duty of the first signal GS1 changes may be eight. For example, when the mode of the display device 100 is switched from the public mode to the private mode, the on-duty of the first signal GS1 may decrease from 100% to 87.5% in a first step ST1 corresponding to first and second frame periods FP1 and FP2, the on-duty of the first signal GS1 may decrease from 87.5% to 75% in a second step ST2 corresponding to third and fourth frame periods FP3 and FP4, the on-duty of the first signal GS1 may decrease from 75% to 62.5% in a third step ST3 corresponding to fifth and sixth frame periods FP5 and FP6, the on-duty of the first signal GS1 may decrease from 62.5% to 50% in a fourth step ST4 corresponding to seventh and eighth frame periods FP7 and FP8, the on-duty of the first signal GS1 may decrease from 50% to 37.5% in a fifth step ST5 corresponding to ninth and tenth frame periods FP9 and FP10, the on-duty of the first signal GS1 may decrease from 37.5% to 25% in a sixth step ST6 corresponding to eleventh and twelfth frame periods FP11 and FP12, the on-duty of the first signal GS1 may decrease from 25% to 12.5% in a seventh step ST7 corresponding to thirteenth and fourteenth frame periods FP13 and FP14, and the on-duty of the first signal GS1 may decrease from 12.5% to 0% in an eighth step ST8 corresponding to fifteenth and sixteenth frame periods FP15 and FP16. The number of emission-off periods of each of the emission signals EM[1], . . . , EM[M] in the on-period of the first signal GS1 may be commonly four in the first, third, fifth, and seventh frame periods FP1, FP3, FP5, and FP7, the number of emission-off periods of each of the emission signals EM[1], . . . , EM[M] in the on-period of the first signal GS1 may be commonly three in the second and ninth frame periods FP2 and FP9, the number of emission-off periods of each of the emission signals EM[1], . . . , EM[M] in the on-period of the first signal GS1 may be commonly two in the fourth and eleventh frame periods FP4 and FP11, the number of emission-off periods of each of the emission signals EM[1], . . . , EM[M] in the on-period of the first signal GS1 may be commonly one in the sixth and thirteenth frame periods FP6 and FP13, and the first signal GS1 may have only the off-period OFF in the eighth, tenth, twelfth, and fourteenth frame periods FP8, FP10, FP12, and FP14. Accordingly, the luminance difference may not occur between the blocks of the image in the first to fourteenth frame periods FP1 to FP14.

In the example of FIG. 10, the number of steps in which the on-duty of the second signal GS2 changes may be eight. For example, when the mode of the display device 100 is switched from the public mode to the private mode, the on-duty of the second signal GS2 may increase from 0% to 12.5% in the first step ST1 corresponding to the first and second frame periods FP1 and FP2, the on-duty of the second signal GS2 may increase from 12.5% to 25% in the second step ST2 corresponding to the third and fourth frame periods FP3 and FP4, the on-duty of the second signal GS2 may increase from 25% to 37.5% in the third step ST3 corresponding to the fifth and sixth frame periods FP5 and FP6, the on-duty of the second signal GS2 may increase from 37.5% to 50% in the fourth step ST4 corresponding to the seventh and eighth frame periods FP7 and FP8, the on-duty of the second signal GS2 may increase from 50% to 62.5% in the fifth step ST5 corresponding to the ninth and tenth frame periods FP9 and FP10, the on-duty of the second signal GS2 may increase from 62.5% to 75% in the sixth step ST6 corresponding to the eleventh and twelfth frame periods FP11 and FP12, the on-duty of the second signal GS2 may increase from 75% to 87.5% in the seventh step ST7 corresponding to the thirteenth and fourteenth frame periods FP13 and FP14, and the on-duty of the second signal GS2 may increase from 87.5% to 100% in the eighth step ST8 corresponding to the fifteenth and sixteenth frame periods FP15 and FP16.

According to some embodiments, the number of steps in which the on-duty of each of the first signal GS1 and the second signal GS2 changes is equal to a multiple of the number of emission cycles EM_CYC of the emission signal EM in one frame period, so that the amount of change in the on-duty may decrease in the steps in which the on-duty changes. For example, when the number of emission cycles EM_CYC of the emission signal EM in one frame period is four, in the example of FIG. 9, the on-duty of the first signal GS1 may decrease by 25% for each step in which the on-duty changes and the on-duty of the second signal GS2 may increase by 25% for each step in which the on-duty changes, and in the example of FIG. 10, the on-duty of the first signal GS1 may decrease by 12.5% for each step in which the on-duty changes, and the on-duty of the second signal GS2 may increase by 12.5% for each step in which the on-duty changes. Thus, according to some embodiments, a luminance difference between images corresponding to the frame periods may decrease during the process in which the mode of the display device 100 is switched between the public mode and the private mode, and the image quality of the display device 100 may be further improved.

Figure 11:
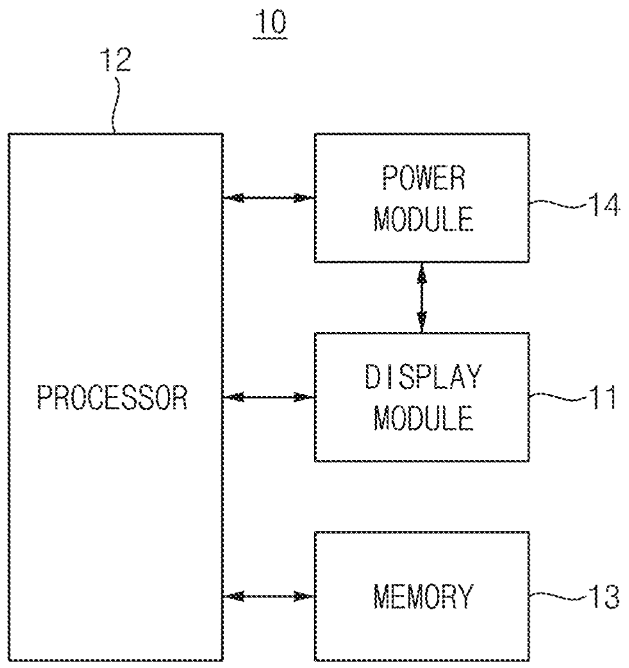
FIG. 11 is a block diagram illustrating an electronic device according to some embodiments.

FIG. 11 is a block diagram illustrating an electronic device 10 according to some embodiments.

Referring to FIGS. 1 and 11, the electronic device 10 may include a display module 11, a processor 12, a memory 13, and a power module 14.

The processor 12 may include at least one of a central processing unit (CPU), an application processor (AP), a graphic processing unit (GPU), a communication processor (CP), an image signal processor (ISP), or a controller. The processor 12 may control the display module 11.

The memory 13 may store data information necessary for an operation of the processor 12 or the display module 11. When the processor 12 executes an application stored in the memory 13, the input image data IDAT and the control signal CTRL may be transmitted to the display module 11, and the display module 11 may output image information based on the input image data IDAT and the control signal CTRL.

The power module 14 may include a power supply module such as a power adapter, a battery device, etc. and a power conversion module that converts power supplied by the power supply module to generate power required for an operation of the electronic device 10.

At least one of the components of the electronic device 10 described above may be included in the display device 100 of FIG. 1 according to some embodiments described above. Further, some of individual modules functionally included in one module may be included in the display device 100, and others may be provided separately from the display device 100. For example, the display device 100 may include the display module 11, and the processor 12, the memory 13, and the power module 14 may be provided in the form of other devices within the electronic device 11 other than the display device 100.

According to some embodiments, the electronic device 10 may be an automotive electronic device mounted on an automobile. When the automobile changes from a stationary state to a moving state (e.g., when a gear of the automobile changes from a parking mode or neutral mode to a drive mode or reverse mode), the processor 12 may transmit the mode switching signal SMODE that indicates a switching from the public mode to the private mode to the panel driver 120 (or the controller 160). Further, when the automobile changes from the moving state to the stationary state (e.g., when the gear of the automobile changes from the driving mode or reverse mode to the parking mode or neutral mode), the processor 12 may transmit the mode switching signal SMODE that indicates a switching from the private mode to the public mode to the panel driver 120 (or the controller 160).

Figure 12:
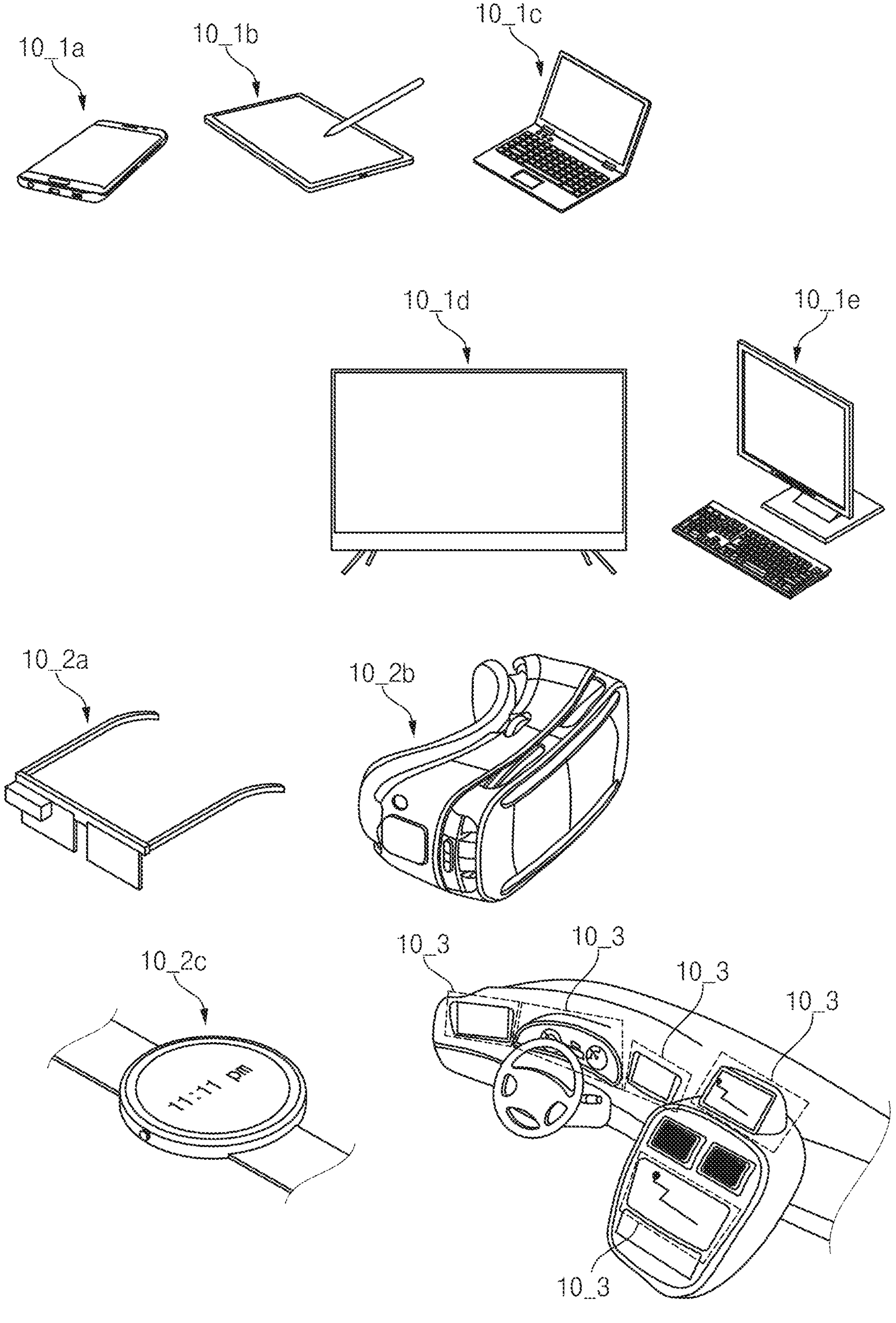
FIG. 12 is a diagram illustrating electronic devices according to some embodiments.

FIG. 12 is a diagram illustrating electronic devices according to some embodiments.

Referring to FIG. 12, electronic devices to which display devices according to some embodiments are applied may include not only image display electronic devices such as a smart phone 10_1*a*, a tablet PC 10_1*b*, a laptop 10_1*c*, a TV 10_1*d*, a desk monitor 10_1*e*, etc. but also wearable electronic devices including display modules such as smart glasses 10_2*a*, a head mounted display 10_2*b*, a smart watch 10_2*c*, etc., vehicle electronic devices 10_3 including display modules such as an instrument panel of an automobile, a center fascia, a center information display CID arranged on a dashboard, a room mirror display, etc.

The display device according to some embodiments may be applied to a display device included in a computer, a notebook, a mobile phone, a smart phone, a smart pad, a smart watch, a PMP, a PDA, an MP3 player, or the like.

Although aspects of some embodiments of a display device and an electronic device according to the present disclosure have been described with reference to the drawings, the illustrated embodiments are examples, and may be modified and changed by a person having ordinary knowledge in the relevant technical field without departing from the technical spirit described in the following claims, and their equivalents.

What is claimed is:

1. A display device comprising:

a display panel comprising a plurality of pixels; and a panel driver configured to drive the display panel, wherein at least one pixel among the pixels comprises:

a first light-emitting element having a first viewing angle;

a second light-emitting element having a second viewing angle different from the first viewing angle;

a first transistor configured to generate a driving current;

a first mode transistor configured to provide the driving current to the first light-emitting element in response to a first signal;

a second mode transistor configured to provide the driving current to the second light-emitting element in response to a second signal; and an emission transistor configured to connect the first transistor to the first and second mode transistors in response to an emission signal having a plurality of emission cycles each comprising an emission-off period and an emission-on period in one frame period, wherein the panel driver is configured to stepwise change an on-duty of each of the first signal and the second signal over a plurality of frame periods in response to a mode switching signal which indicates a switching from a first mode to a second mode, and wherein a number of steps in which the on-duty changes is determined based on a number of the emission cycles of the emission signal in one frame period.

2. The display device of claim 1, wherein the on-duty is configured to change on one frame period basis, and wherein the number of the steps in which the on-duty changes is equal to the number of the emission cycles of the emission signal in one frame period.

3. The display device of claim 1, wherein the on-duty changes on N frame periods basis, where N is a natural number greater than or equal to 2, and wherein the number of the steps in which the on-duty changes is equal to a value obtained by multiplying N by the number of the emission cycles of the emission signal in one frame period.

4. The display device of claim 1, wherein the on-duty uniformly changes in the steps in which the on-duty changes.

5. The display device of claim 1, wherein the first viewing angle is a wide viewing angle, and wherein the second viewing angle is a narrow viewing angle narrower than the first viewing angle.

6. The display device of claim 1, wherein the first light-emitting element is a public light-emitting element in which light emitted from the first light-emitting element is configured to be provided to both a front of the display device and a side of the display device, and wherein the second light-emitting element is a private light-emitting element in which light emitted from the second light-emitting element is provided to the front of the display device and not provided to the side of the display device.

7. The display device of claim 1, wherein, based on the mode switching signal indicating a switching from a public mode to a private mode, the panel driver is configured to stepwise decrease an on-duty of the first signal and to stepwise increase an on-duty of the second signal over a plurality of first frame periods, and wherein, based on the mode switching signal indicating a switching from the private mode to the public mode, the panel driver is configured to stepwise increase the on-duty of the first signal and to stepwise decreases the on-duty of the second signal over a plurality of second frame periods.

8. The display device of claim 1, wherein each of the first signal and the second signal is a global signal concurrently provided to the pixels.

9. The display device of claim 1, wherein the first transistor comprises a gate, a first terminal connected to a power line configured to transmit a first power voltage, and a second terminal, and wherein the at least one pixel further comprises:

a second transistor configured to transmit a data signal to a first node in response to a first gate signal;

a third transistor configured to connect the gate and the second terminal of the first transistor in response to a second gate signal;

a fourth transistor configured to transmit a first initialization voltage to the gate of the first transistor in response to a third gate signal;

a fifth transistor configured to transmit a reference voltage to the first node in response to the second gate signal;

a sixth transistor configured to transmit a second initialization voltage to a first terminal of the first light-emitting element in response to a fourth gate signal;

a seventh transistor configured to transmit the second initialization voltage to a first terminal of the second light-emitting element in response to the fourth gate signal;

a first capacitor connected between the power line and the first node; and a second capacitor connected between the first node and the gate of the first transistor.

10. The display device of claim 1, wherein the first transistor comprises a gate, a first terminal, and a second terminal, and wherein the at least one pixel further comprises;

a second transistor configured to transmit a data signal to the first terminal of the first transistor in response to a first gate signal;

a third transistor configured to connect the gate and the second terminal of the first transistor in response to a second gate signal;

a fourth transistor configured to transmit a first initialization voltage to the gate of the first transistor in response to a third gate signal;

a fifth transistor configured to transmit a first power voltage to the first terminal of the first transistor in response to the emission signal;

a sixth transistor configured to transmit a second initialization voltage to a first terminal of the first light-emitting element in response to a fourth gate signal;

a seventh transistor configured to transmit the second initialization voltage to a first terminal of the second light-emitting element in response to the fourth gate signal; and a first capacitor connected between a power line configured to transmit the first power voltage and the gate of the first transistor.

11. An electronic device comprising:

a processor; and a display device configured to receive input image data and a mode switching signal which indicates a switching from a first mode to a second mode, and to display an image corresponding to the input image data, wherein the display device comprises:

a display panel comprising a plurality of pixels; and a panel driver configured to drive the display panel, wherein at least one pixel among the pixels comprises:

a first light-emitting element having a first viewing angle;

a second light-emitting element having a second viewing angle different from the first viewing angle;

a first transistor configured to generate a driving current;

a first mode transistor configured to provide the driving current to the first light-emitting element in response to a first signal;

a second mode transistor configured to provide the driving current to the second light-emitting element in response to a second signal; and an emission transistor configured to connect the first transistor to the first and second mode transistors in response to an emission signal having a plurality of emission cycles each comprising an emission-off period and an emission-on period in one frame period, wherein the panel driver is configured to stepwise change an on-duty of each of the first signal and the second signal over a plurality of frame periods in response to the mode switching signal, and wherein a number of steps in which the on-duty changes is determined based on a number of the emission cycles of the emission signal in one frame period.

12. The electronic device of claim 11, wherein the on-duty changes on one frame period basis, and wherein the number of the steps in which the on-duty changes is equal to the number of the emission cycles of the emission signal in one frame period.

13. The electronic device of claim 11, wherein the on-duty changes on N frame periods basis, where N is a natural number greater than or equal to 2, and wherein the number of the steps in which the on-duty changes is equal to a value obtained by multiplying N by the number of the emission cycles of the emission signal in one frame period.

14. The electronic device of claim 11, wherein the on-duty uniformly changes in the steps in which the on-duty changes.

15. The electronic device of claim 11, wherein the electronic device is an automotive electronic device mounted on an automobile, and wherein, based on the automobile changing from a stationary state to a moving state, the processor is configured to transmit the mode switching signal, which indicates a switching from a public mode in which an image displayed from the display device is viewed by both a first user positioned on a front of the display device and a second user positioned on a side of the display device to a private mode in which an image displayed from the display device is viewed by the first user and not viewed by the second user, to the panel driver.

16. The electronic device of claim 15, wherein, based on the automobile changing from the moving state to the stationary state, the processor is configured to transmit the mode switching signal, which indicates a switching from the private mode to the public mode, to the panel driver.

17. The electronic device of claim 11, wherein the first viewing angle is a wide viewing angle, and wherein the second viewing angle is a narrow viewing angle narrower than the first viewing angle.

18. The electronic device of claim 11, wherein the first light-emitting element is a public light-emitting element in which light emitted from the first light-emitting element is configured to be provided to a front of the display device and a side of the display device, and wherein the second light-emitting element is a private light-emitting element in which light emitted from the second light-emitting element is provided to the front of the display device and not provided to the side of the display device.

19. The electronic device of claim 11, wherein, based on the mode switching signal indicating a switching from a public mode to a private mode, the panel driver is configured to stepwise decrease an on-duty of the first signal and to stepwise increase an on-duty of the second signal over a plurality of first frame periods, and wherein, based on the mode switching signal indicating a switching from the private mode to the public mode, the panel driver is configured to stepwise increase the on-duty of the first signal and to stepwise decrease the on-duty of the second signal over a plurality of second frame periods.

20. The electronic device of claim 11, wherein each of the first signal and the second signal is a global signal concurrently provided to the pixels.

* * * * *